(12) United States Patent
Hino (10) Patent No.: US 7,299,167 B2
(45) Date of Patent: Nov. 20, 2007

(54) FUNCTION ADDING SYSTEM

(75) Inventor: Yasutaka Hino, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 532 days.

(21) Appl. No.: 10/910,651

(22) Filed: Aug. 4, 2004

(65) Prior Publication Data

US 2005/0108443 A1    May 19, 2005

(30) Foreign Application Priority Data

Oct. 23, 2003   (JP)   ............... 2003-363133

(51) Int. Cl.
*G06F 17/50*   (2006.01)
*G06F 9/445*   (2006.01)
*H04Q 9/00*    (2006.01)

(52) U.S. Cl. .......................... 703/13; 725/78

(58) Field of Classification Search .................. 703/2, 703/13, 22; 725/78; 708/8, 104, 270
See application file for complete search history.

(56) References Cited

U.S. PATENT DOCUMENTS 6,151,567 A * 11/2000 Ames et al. .................. 703/11

2002/0052848 A1 * 5/2002 Kawai et al. ................. 705/52
2002/0059051 A1 * 5/2002 Yoshizawa et al. ........... 703/13
2004/0045027 A1 * 3/2004 Takamura et al. ............ 725/78

FOREIGN PATENT DOCUMENTS

| JP | 5-28120    | 2/1993 |
| JP | 7-182294   | 7/1995 |
| JP | 2000-89941 | 3/2000 |
| JP | 2002-78036 | 3/2002 |
| JP | 2002-215298| 7/2002 |

* cited by examiner

*Primary Examiner*—Thai Phan
(74) *Attorney, Agent, or Firm*—Westerman, Hattori, Daniels & Adrian, LLP.

(57) ABSTRACT

A function adding system capable of adding a function irrespective of resources of a device is realized. A function adding system for adding a new function to an incorporated device has an arithmetic processing device in which a program to realize an additional function is installed, and a device which is an incorporated device for, when using the additional function, accessing the arithmetic processing device via a network, then making a request for processing of the additional function, and receiving a result of processing.

9 Claims, 9 Drawing Sheets

FUNCTION ADDING SYSTEM

BACKGROUND OF THE INVENTION

1. Field of the Invention

This invention relates to a function adding system for adding a new function to a home electronic device or an incorporated device such as measuring device, and particularly to a function adding system capable of adding a function irrespective of the resources of the device.

2. Description of the Prior Art

Conventional function adding systems for adding a new function to a home electronic device or an incorporated device such as measuring device are disclosed in the following related-art references:

JP-A-05-028120;
JP-A-07-182294;
JP-A-2000-089941;
JP-A-2002-078036; and
JP-A-2002-215298.

Figure 1:
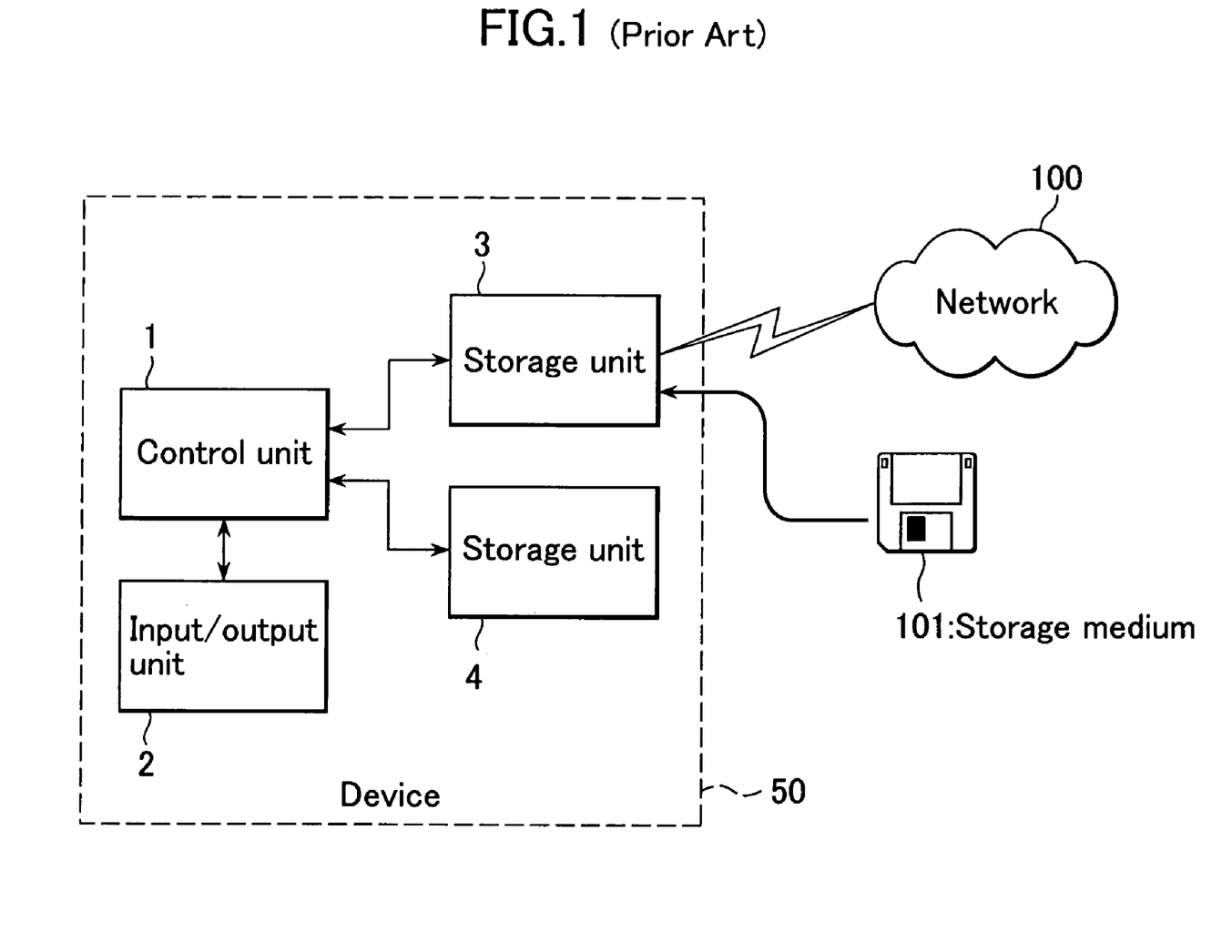
FIG. 1 is a structural block diagram showing an example of conventional function adding system for adding a new function to a home electronic device or an incorporated device such as measuring device.

FIG. 1 is a structural block diagram showing an example of conventional function adding system for adding a new function to a home electronic device or an incorporated device such as measuring device.

In FIG. 1, a control unit 1 for controlling an entire device such as a central processing unit (CPU), an input/output unit 2 such as display unit, switch or wireless remote controller, a storage unit 3 in which a program to be executed is stored, a storage unit 4 for work in which a file or the like is temporarily stored when executing the program, a general-purpose network 100 such as the Internet or local area network (LAN), and a storage medium 101 such as flexible disk or compact disc read-only memory (CD-ROM) are described.

The control unit 1, the input/output unit 2, the storage unit 3 and the storage unit 4 form a device 50 that is an incorporated device.

An input/output of the input/output unit 2 is interconnected with the control unit 1. Also inputs/outputs of the storage unit 3 and the storage unit 4 are interconnected with the control unit 1.

The operation in the conventional example shown in FIG. 1 will now be briefly described. When started, the control unit 1 performs initialization of the device 50 as it is necessary, and reads out and executes the program stored in the storage unit 3.

The control unit 1 controls the input/output unit 2 according to the program that is being executed. When executing the program, the control unit 1 also prepares a temporary file or the like and properly stores it into the storage unit 4, if necessary, and thus operates the device 50.

However, in the device 50 as shown in FIG. 1, the program is incorporated in the device. Therefore, in the case of correcting trouble of the program or adding a function, the program stored in the storage unit 3 must be modified or another program must be added.

Figure 2:
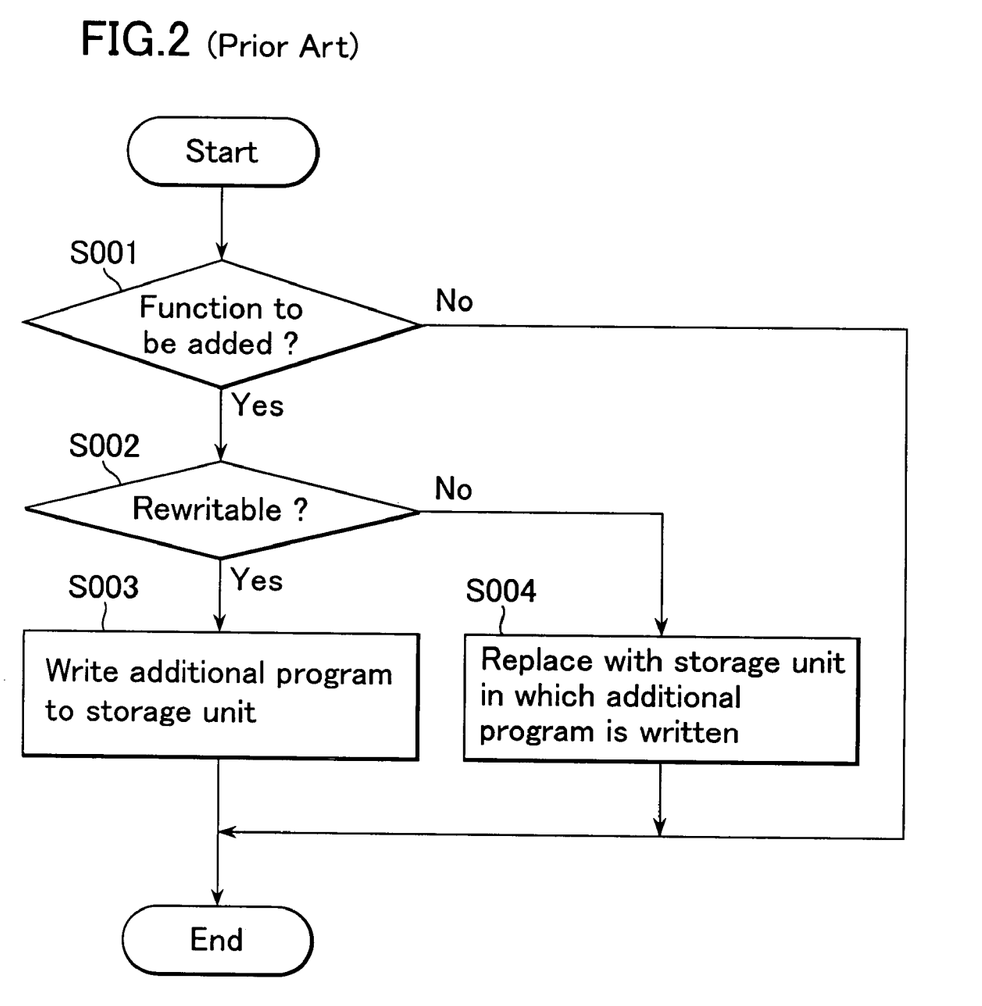
FIG. 2 is a flowchart for explaining the procedure to add a function.

The operation of adding a function in the conventional example shown in FIG. 1 will be described with reference to FIG. 2. FIG. 2 is a flowchart for explaining the procedure to add a function.

At "S001" in FIG. 2, it is judged whether addition of a function to the device 50 is necessary or not. If it is judged that addition of a function is necessary, it is judged at "S002" in FIG. 2 whether the program in the storage unit 3 of the device 50 is rewritable or not.

If it is judged at "S002" in FIG. 2 that the program in the storage unit 3 is rewritable, an additional program is written to the storage unit 3 at "S003" in FIG. 2.

For example, the additional program is written to the storage unit 3 via the network 100 or written to the storage unit 3 via the storage medium 101.

On the other hand, if it is judged at "S002" in FIG. 2 that the program in the storage unit 3 is not rewritable, the storage unit 3 of the device 50 is replaced with a storage unit in which an additional program is already written, at "S004" in FIG. 2 (i.e., read-only memory (ROM) replacement is performed).

However, in the addition of a function in the conventional example as shown in FIG. 1, the resources of the device 50, which is an incorporated device, such as the storage capacity of the storage unit 3 and the processing speed of the control unit 1, are limited in many cases in order to reduce the cost. Therefore, the resources of the device cannot cope with addition of a function that requires resources exceeding the processing speed and the storage capacity that are not anticipated at the time of manufacturing.

SUMMARY OF THE INVENTION

It is an object of this invention to realize a function adding system capable of adding a function irrespective of the resources of the device.

DETAILED DESCRIPTION OF THE PREFERRED EMBODIMENTS

Figure 3:
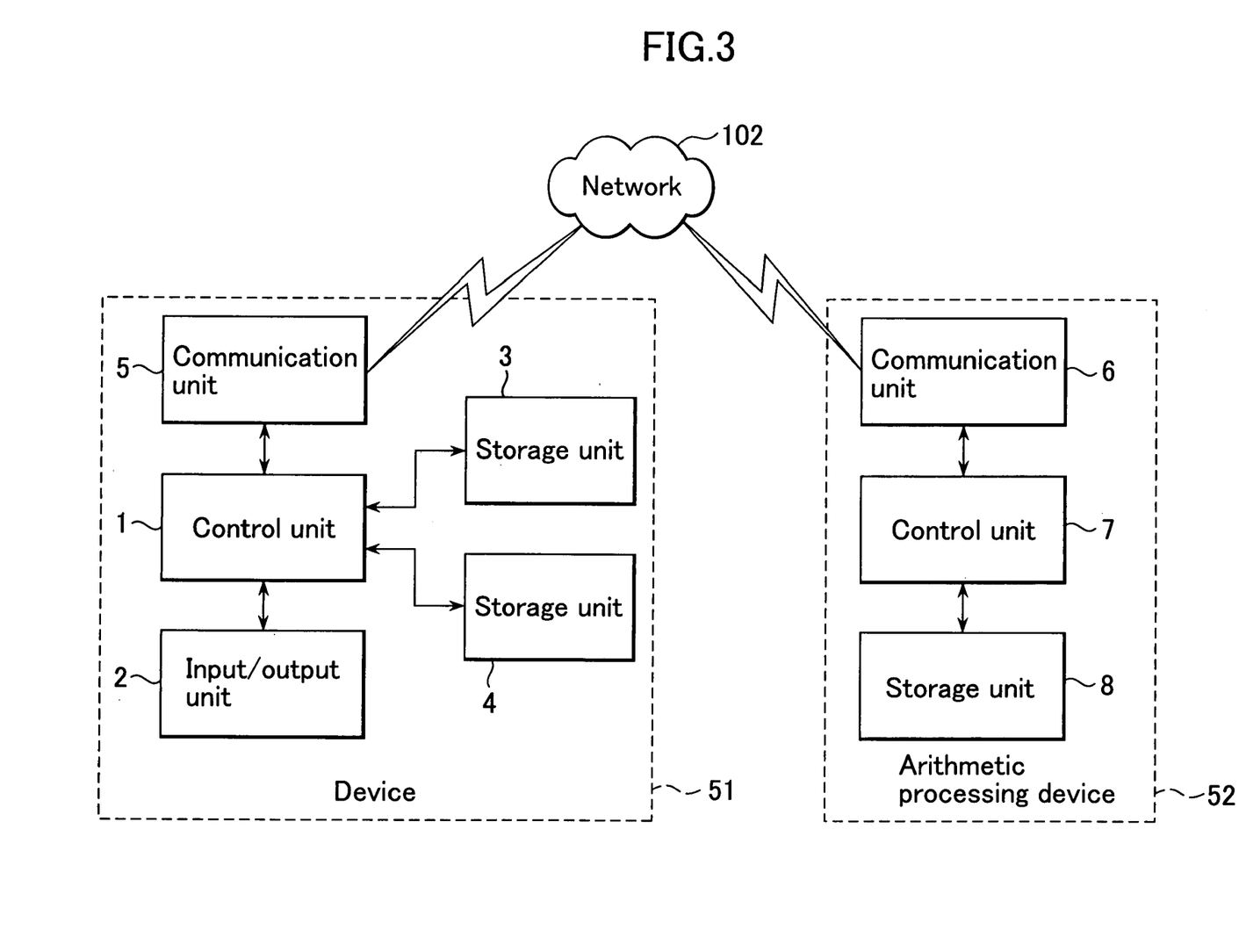
FIG. 3 is a structural block diagram showing an embodiment of a function adding system according to this invention.

This invention will now be described in detail with reference to the drawings. FIG. 3 is a structural block diagram showing an embodiment of a function adding system according to this invention. In FIG. 3, a control unit 1, an input/output unit 2, as storage unit 3 and the storage unit 4 are denoted by the same numerals as in FIG. 1, and communication units 5 and 6 such as network interfaces, a control unit 7 for controlling the entire device such as a CPU, a storage unit 8 in which a program to realize addition of a function is stored, and a general-purpose network 102 such as the Internet or LAN are described.

The control unit 1, the input/output unit 2, the storage unit 3, the storage unit 4 and the communication unit 5 form a device 51 that is an incorporated device. The communication unit 6, the control unit 7 and the storage unit 8 form an arithmetic processing unit 52.

In the device 51, which is an incorporated device, an input/output of the input/output unit 2 is interconnected with the control unit 1, and also inputs/outputs of the storage unit 3 and the storage unit 4 are interconnected with the control unit 1. An input/output of the control unit 1 is interconnected with the communication unit 5. The communication unit 5 is connected to the network 102.

On the other hand, in the arithmetic processing device 52, an input/output of the storage unit 8 is interconnected with the control unit 7, and an input/output of the control unit 7 is interconnected with the communication unit 6. The communication unit 6 is connected to the network 102.

Figure 4:
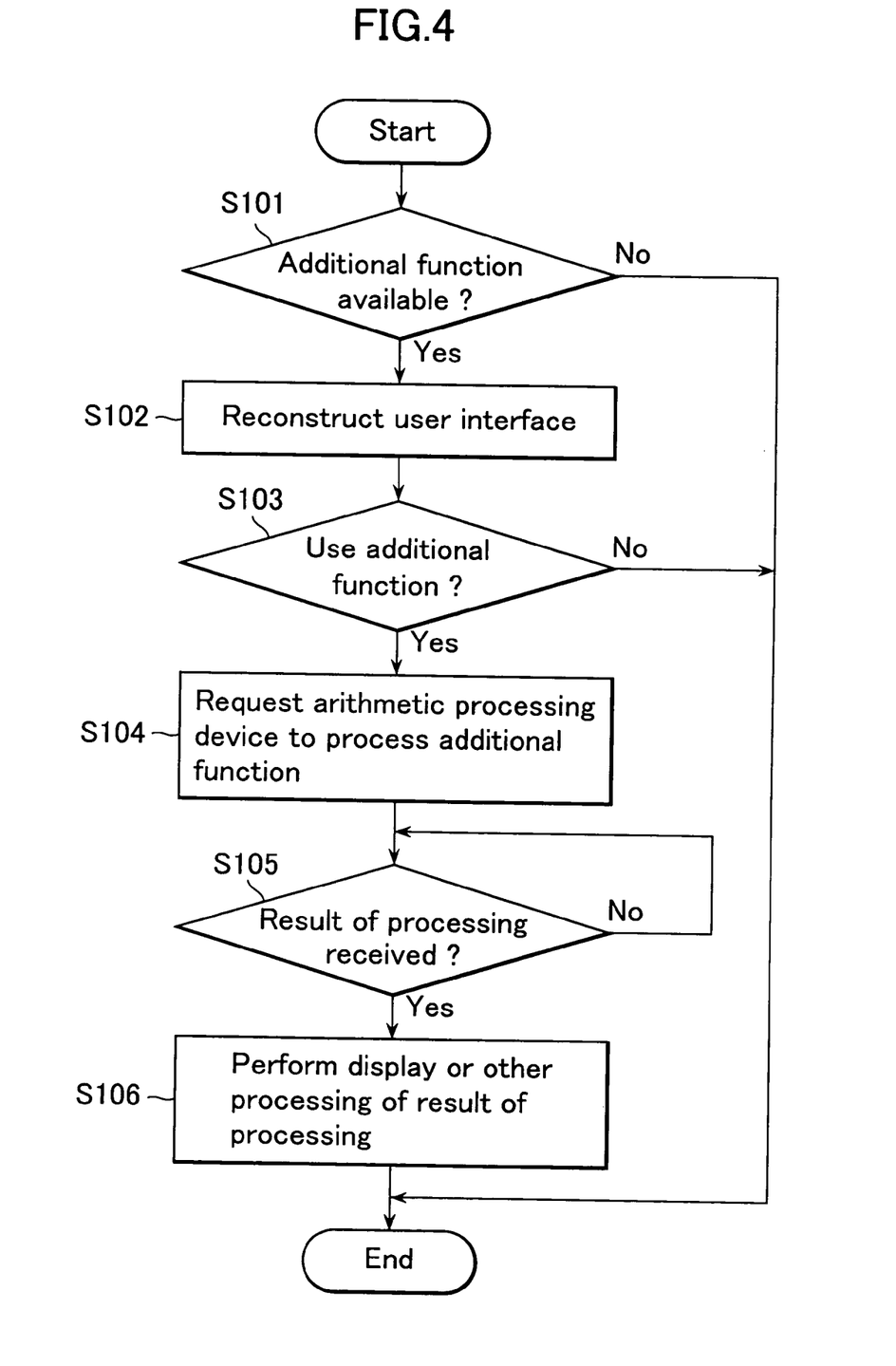
FIG. 4 is a flowchart for explaining the operation of a control unit of a device that is an incorporated device.
Figure 5:
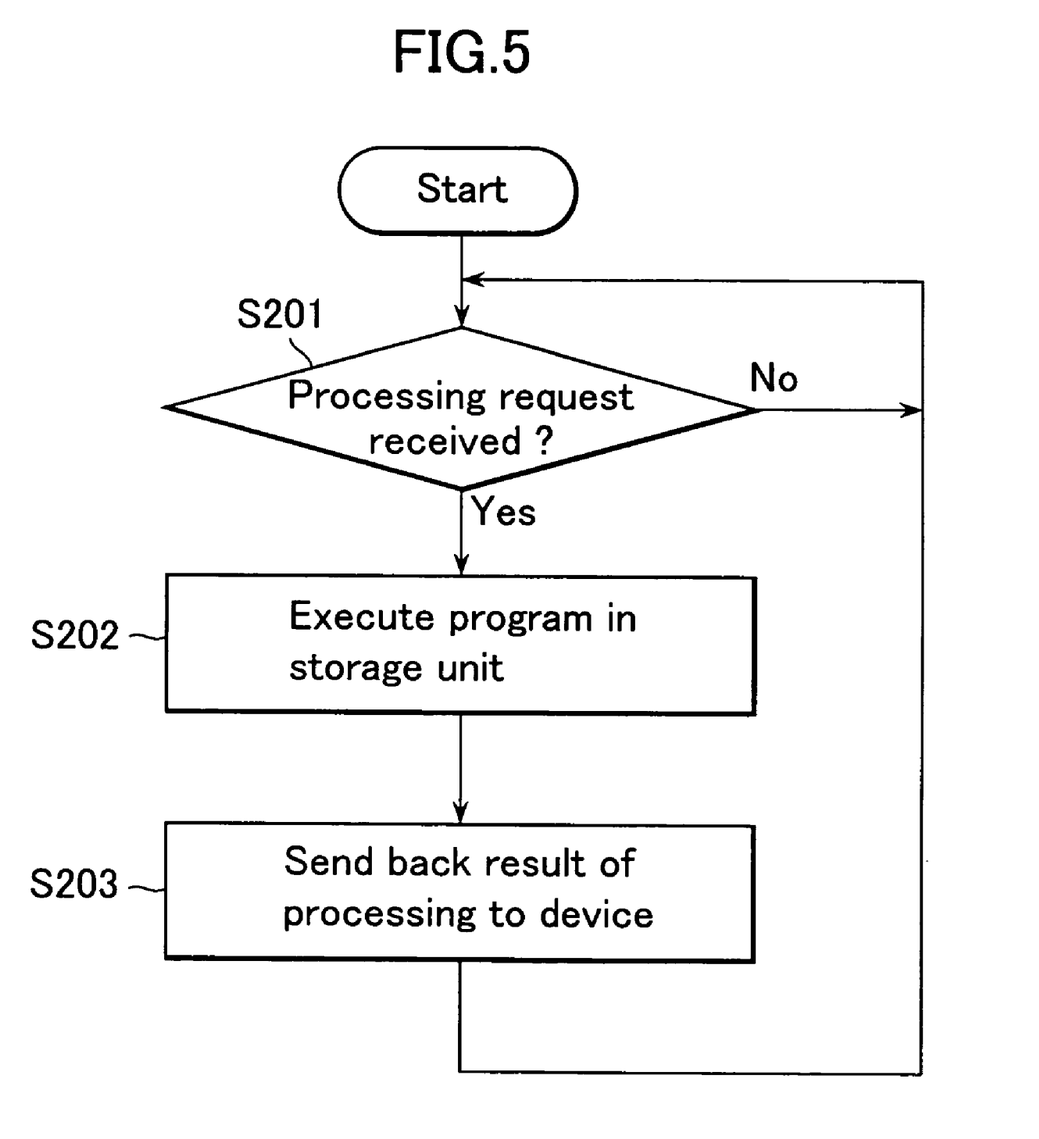
FIG. 5 is a flowchart for explaining the operation of a control unit of an arithmetic processing unit.

The operation in the embodiment shown in FIG. 3 will now be described with reference to FIGS. 4 and 5. However, the ordinary operation of the device except for the operation to add a function is similar to the operation in the conventional example shown in FIG. 1 and therefore will not be described further in detail. FIG. 4 is a flowchart for explaining the operation of the control unit 1 of the device 51, which is an incorporated device. FIG. 5 is a flowchart for explaining the operation of the control unit 7 of the arithmetic processing device 52.

In the device 51, which is an incorporated device, at "S101" in FIG. 4, the control unit 1 judges whether or not an additional function is available by controlling the communication unit 5 to access the arithmetic processing device 52 that is registered in advance, via the network 102. If it is judged that an additional function is not available, the operation related to function addition is ended.

If it is judged at "S101" in FIG. 4 that an additional function is available, the control unit 1 at "S102" in FIG. 4 reconstructs a user interface to be displayed on the input/output unit 2 (display unit).

Specifically, in the case where the input/output unit 2 (display unit) is displaying a graphical user interface (GUI), a button to execute the additional function is additionally displayed on the display screen of the input/output unit 2 (display unit) or the hierarchical structure of menu is changed in accordance with the additional function. In the case where a physical switch is used, the function allocated to the switch is properly changed.

At "S103" in FIG. 4, the control unit 1 judges whether use of the additional function has been selected by the input/output unit 2 (on the GUI or by operating the switch or the like) or not. If it is judged that use of the additional function has not been selected, the operation related to function addition is ended.

If it is judged at "S103" in FIG. 4 that use of the additional function has been selected, the control unit 1 at "S104" in FIG. 4 controls the communication unit 5 to send data generated in the device and information such as a parameter or the like, if necessary, to the arithmetic processing device 52 via the network 102, and to request for processing of the additional function.

At "S105" in FIG. 4, the control unit 1 waits until it receives the result of processing from the arithmetic processing device 52 by controlling the communication unit 5.

When the result of processing is received from the arithmetic processing device 52 by controlling the communication unit 5 at "S105" in FIG. 4, the control unit 1 at "S106" in FIG. 4 causes the received result of processing to be displayed.

Specifically, the control unit 1 causes the input/output unit 2 (display unit) to display the received result of processing or performs further processing using the received result of processing as an input for internal processing in the device 51.

On the other hand, in the arithmetic processing device 52, at "S201" in FIG. 5, the control unit 7 judges whether or not a request for processing of the additional function is received from the device 51 via the network 102 by controlling the communication unit 6. If it is judged that a request for processing of the additional function is not received, the control unit 7 waits.

If it is judged at "S201" in FIG. 5 that a request for processing of the additional function is received, the control unit 7 at "S202" in FIG. 5 reads out the program to execute the additional function, stored in the storage unit 8, and inputs the data and information such as a parameter received from the device 51, if necessary, to execute the program.

At "S203" in FIG. 5, the control unit 7 controls the communication unit 6 to send the result of processing, which is the result of execution of the program to realize the additional function, to the device 51 via the network 102.

Thus, in the case of using an additional function, by accessing the arithmetic processing device 52 in which the program to execute the additional function is installed, via the network 102, then making a request for processing of the additional function, and receiving the result of processing, the device 51, which is an incorporated device, can add the function irrespective of the resources of the device (device 51).

Figure 6:
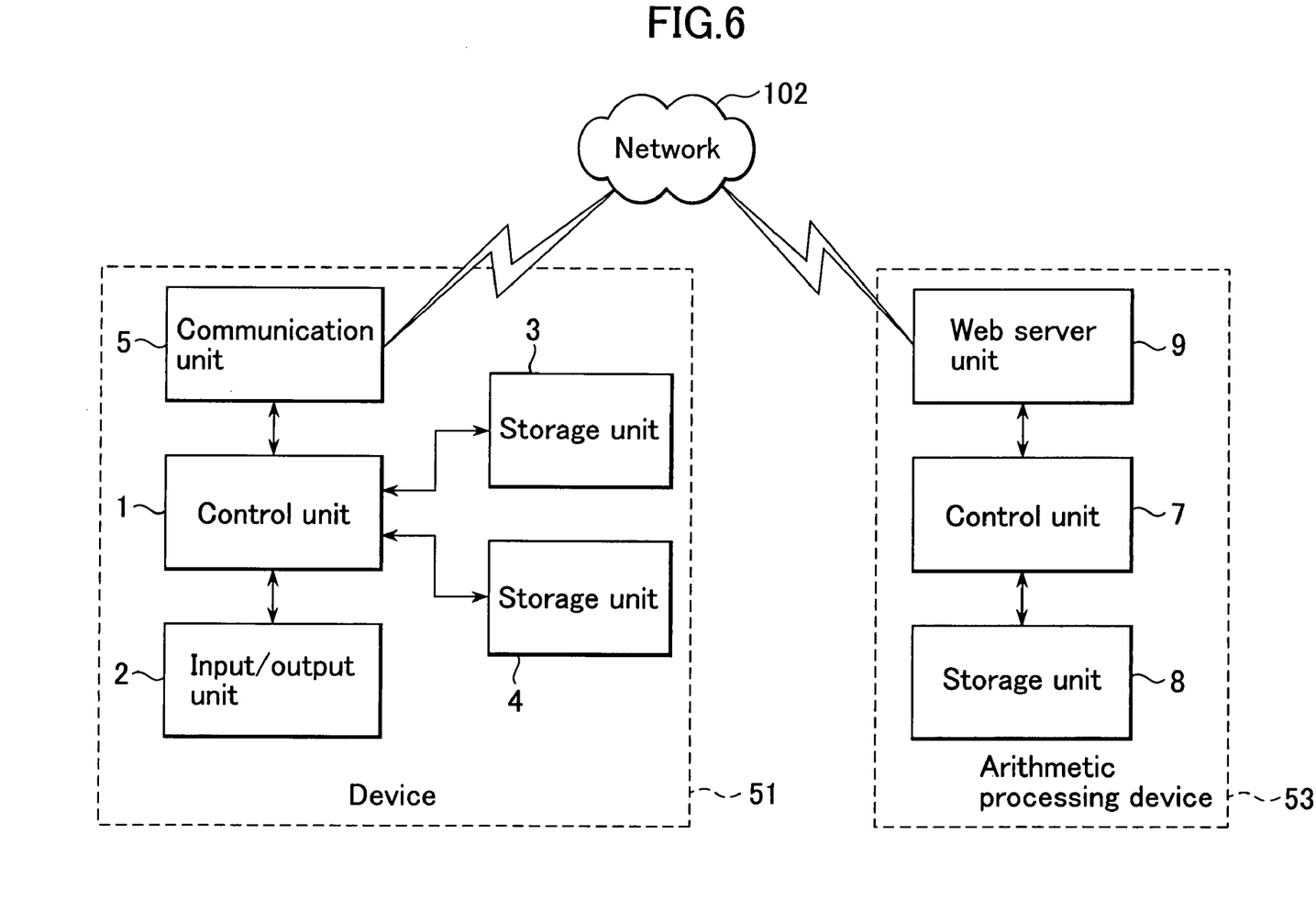
FIG. 6 is a structural block diagram showing a second embodiment of the function adding system according to this invention.

FIG. 6 is a structural block diagram showing a second embodiment of the function adding system according to this invention. In FIG. 6, a control unit 1, an input/output unit 2, a storage unit 3, a storage unit 4, a communication unit 5, a storage unit 7, a storage unit 8, a device 51 and a network 102 are denoted by the same numerals as in FIG. 3, and a web server unit 9 is described. The control unit 7, the storage unit 8 and the web server unit 9 form an arithmetic processing device 53.

In the device 51, which is an incorporated device, an input/output of the input/output unit 2 is interconnected with the control unit 1, and also inputs/outputs of the storage unit 3 and the storage unit 4 are interconnected with the control unit 1. An input/output of the control unit 1 is interconnected with the communication unit 5. The communication unit 5 is connected to the network 102.

On the other hand, in the arithmetic processing device 53, an input/output of the storage unit 8 is interconnected with the control unit 7, and an input/output of the control unit 7 is interconnected with the web server unit 9. The web server unit 9 is connected to the network 102.

Figure 7:
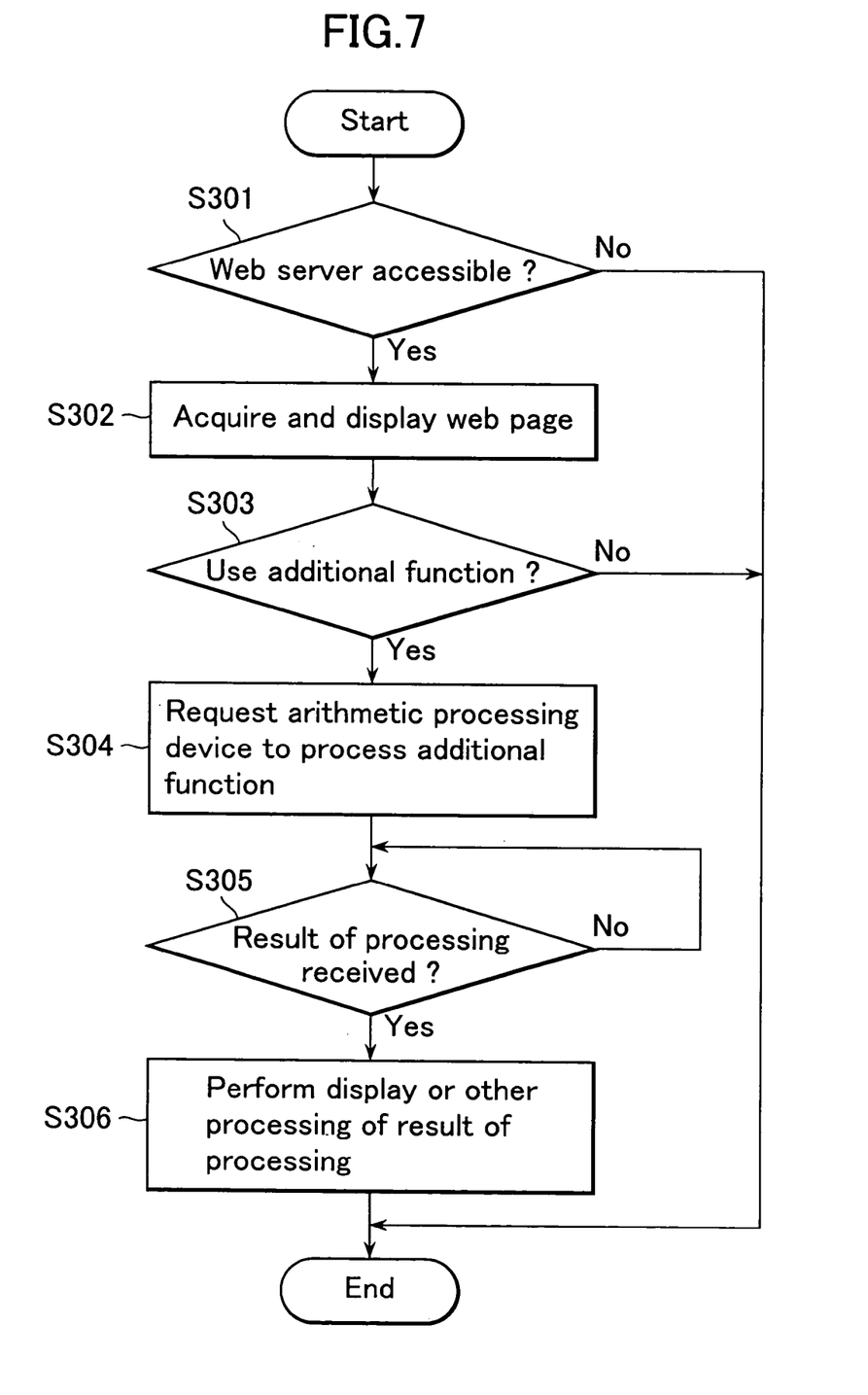
FIG. 7 is a flowchart for explaining the operation of a control unit of a device that is an incorporated device.
Figure 8:
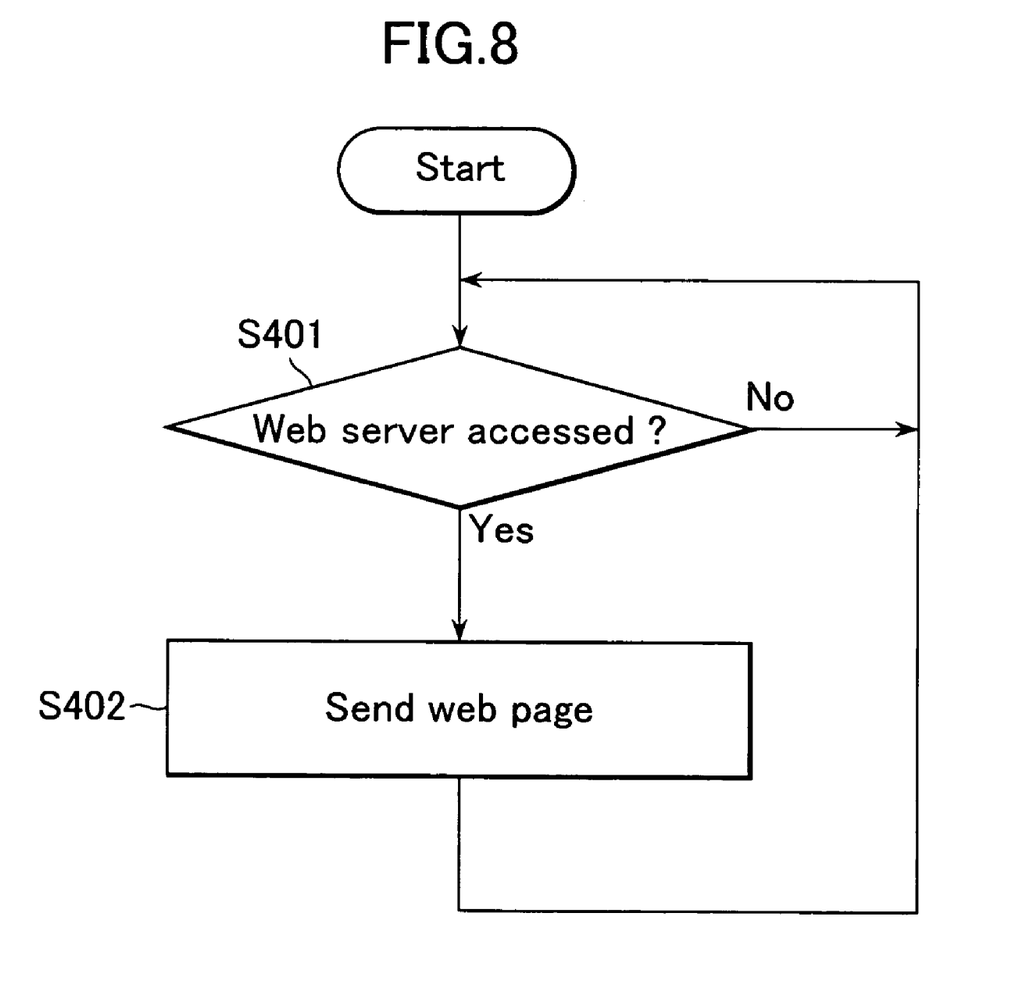
FIG. 8 is a flowchart for explaining the operation of a Web server unit of an arithmetic processing unit.
Figure 9:
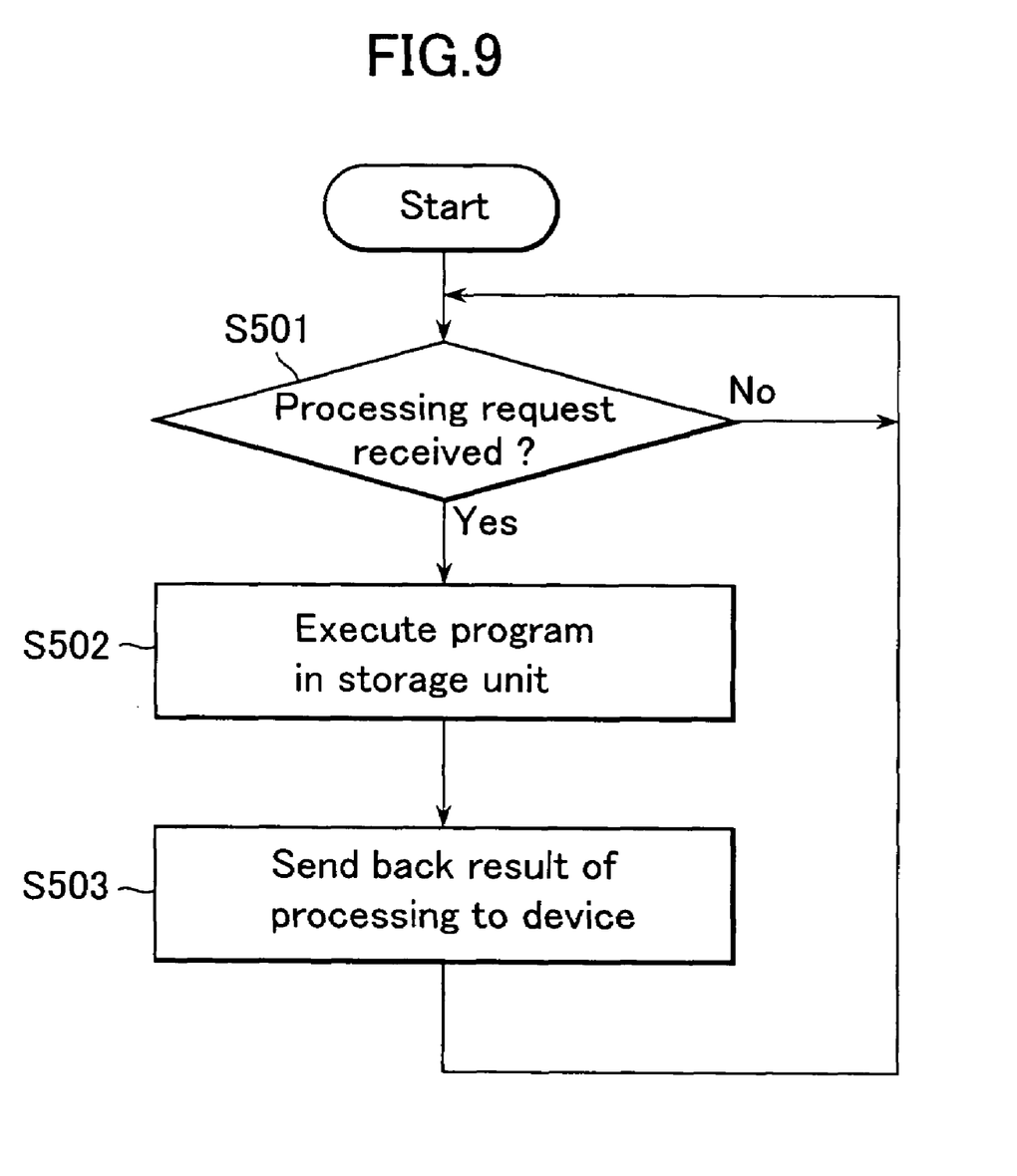
FIG. 9 is a flowchart for explaining the operation of a control unit of the arithmetic processing unit.

The operation in the second embodiment shown in FIG. 6 will now be described with reference to FIGS. 7, 8 and 9. However, the ordinary operation of the device except for the operation to add a function is similar to the operation in the conventional example shown in FIG. 1 and therefore will not be described further in detail. FIG. 7 is a flowchart for explaining the operation of the control unit 1 of the device 51, which is an incorporated device. FIG. 8 is a flowchart for explaining the operation of the web server unit 9 of the arithmetic processing device 53. FIG. 9 is a flowchart for explaining the operation of the control unit 7 of the arithmetic processing device 53.

In the device 51, which is an incorporated device, the control unit 1 at "S301" in FIG. 7 judges whether or not the web server unit 9 of the arithmetic processing device 53 that is registered in advance is accessible via the network 102 by controlling the communication unit 5. If it is judged that the web server unit 9 is not accessible, the operation related to function addition is ended.

If it is judged at "S301" in FIG. 7 that the web server unit 9 is accessible, the control unit 1 at "S302" in FIG. 7 acquires a web page from the web server unit 9 of the arithmetic processing device 53 and causes the input/output unit 2 (display unit) to display the web page.

Specifically, the control unit 1 accesses the web server unit 9 by using a web browser, then acquires a web page containing a software component such as "JAVA (object-oriented interpreter language developed by Sun Microsystems; trademark or registered trademark of Sun Microsystems) applet" or the like, and causes the input/output unit 2 (display unit) to display the web page.

Then, a button to execute an additional function is displayed on the web page, and as the button is operated, the program to execute the additional function in the arithmetic processing device 53 is started through a common gateway interface (CGI) or the like.

At "S303" in FIG. 7, the control unit 1 judges whether or not use of the additional function has been selected by the input/output unit 2 (by operation of the user interface on the web page). If it is judged that use of the additional function has not been selected, the operation related to function addition is ended.

If it is judged at "S303" in FIG. 7 that use of the additional function has been selected, the control unit 1 at "S304" in FIG. 7 controls the communication unit 5 to send information such as a parameter, if necessary, to the web server unit 9 of the arithmetic processing device 53 via the network 102 and to request for processing of the additional function.

At "S305" in FIG. 7, the control unit 1 waits until it receives the result of processing from the web server unit 9 of the arithmetic processing unit 53 by controlling the communication unit 5.

When the result of processing is received from the web server unit 9 of the arithmetic processing device 53 by controlling the communication unit 5 at "S305" in FIG. 7, the control unit 1 at "S306" in FIG. 7 causes the received result of processing to be displayed.

Specifically, the control unit 1 causes the input/output unit 2 (display unit) to display the received result of processing or performs further processing by using the received result of processing as an input for internal processing in the device 51.

On the other hand, at "S401" in FIG. 8, the web server unit 9 of the arithmetic processing device 53 judges whether it is accessed by the device 51 via the network 102 or not. If it is judged that the web server unit 9 is not accessed, it waits.

If it is judged at "S401" in FIG. 8 that the web server unit 9 is accessed, the web server unit 9 of the arithmetic processing device 53 at "S402" in FIG. 8 sends a web page for executing the additional function corresponding to the device 51, which is an incorporated device now accessing the web server unit 9, to the device 51 via the network 102.

Moreover, in the arithmetic processing device 53, at "S501" in FIG. 9, the control unit 7 judges whether or not a request for processing of the additional function is received from the device 51 via the network 102 by controlling the web server unit 9. If it is judged that a request for processing of the additional function is not received, the control unit 7 waits.

If it is judged at "S501" in FIG. 9 that a request for processing of the additional function is received, the control unit 7 at "S502" in FIG. 9 reads out the program to realize the additional function, stored in the storage unit 8, and inputs the information such as a parameter received from the device 51, if necessary, to execute the program.

At "S503" in FIG. 9, the control unit 7 controls the web server unit 9 to send the result of processing, which is the result of execution of the program to realize the additional function, to the device 51 via the network 102.

Thus, in the case of using an additional function, by accessing the web server unit 9 of the arithmetic processing device 53 in which the program to execute the additional function is installed, via the network 102, then making a request for processing of the additional function and receiving the result of processing, the device 51, which is an incorporated device, can add the function irrespective of the resources of the device (device 51).

In this case, since the control unit 1 causes the display unit to display the web page sent from the web server unit 9 by using the web browser, the control unit 1 need not perform reconstruction of the user interface or the like such as additional display of a button to execute the additional function on the display screen or change of the hierarchical structure of menu corresponding to the additional function.

While the two storage units 3 and 4 are described in order to simplify the explanation in the embodiments shown in FIGS. 3 and 6, a single storage unit may be used to realize the functions of the storage unit 3 and the storage unit 4.

In the description of the embodiment shown in FIG. 3, if it is judged that the additional function is available, the control unit 1 performs reconstruction of the user interface such as additional display of a button to execute the additional function or change of the hierarchical structure of menu corresponding to the additional function. However, the user interface itself may be downloaded via the network or may be read from a storage medium such as flexible disk or CD-ROM.

In the description of the embodiment shown in FIG. 3, if it is judged that the additional function is available, the control unit 1 performs reconstruction of the user interface such as additional display of a button to execute the additional function or change of the hierarchical structure of menu corresponding to the additional function. However, the user interface may be preset instead of dynamically reconstructing the user interface as described above.

Specifically, a button to execute the additional function can be displayed in advance, or the hierarchical structure of menu corresponding to the additional function can be displayed in advance.

In such cases, since the user interface is not reconstructed frequently, the load on the control unit 1 of the device 51, which is an incorporated device, is reduced.

In the description of the embodiment shown in FIG. 3, if it is judged that the additional function is available, the control unit 1 performs reconstruction of the user interface such as additional display of a button to execute the additional function or change of the hierarchical structure of menu corresponding to the additional function. However, the user interface may be reconstructed when a designated operation is performed, instead of dynamically reconstructing the user interface as described above.

Specifically, the user interface is reconstructed only when the power is turned on while a specific button is being pressed or when plural specific buttons are simultaneously pressed, or the like.

In such cases, since the user interface is not reconstructed frequently, the load on the control unit 1 of the device 51, which is an incorporated device, is reduced.

Moreover, when certain trouble disables use of the additional function of the arithmetic processing device 52 or 53 during processing, use of the corresponding user interface may be disabled.

Specifically, an additionally displayed button or menu is deleted, or operation (press, selection or the like) of the button or menu is disabled while the button or menu is still displayed.

In such cases, a request for processing of the additional function that is disabled during processing can be prevented. In the latter case, since the user interface is not reconstructed frequently, the load on the control unit 1 of the device 51, which is an incorporated device, is reduced.

It is described in the embodiment shown in FIG. 3 and the other drawings that the arithmetic processing device 52 (or 53) is simply connected to the network 102. A specific example of the arithmetic processing device may be a server prepared by a manufacturer or a personal computer installed at home.

In the former case, the device 51 (for example, home electronic device), which is an incorporated device, accesses the server prepared by the manufacturer via the Internet and causes the additional function to be processed on the server. In this case, the manufacturer can charge the user in accordance with the time for which the user uses the server.

In the latter case, the device 51 (for example, home electronic device), which is an incorporated device, causes the additional function to be processed by using the remaining resources of the personal computer that is connected to a LAN at home and in which a program to execute the additional function has been installed in advance.

Specific examples of the device 51, which is an incorporated device, include a hard disk recorder, measuring device, copy machine, air-conditioning equipment such as air conditioner, and so on. They can be applied to expansion of a timer function or expansion of a setting function of general home electronic devices.

For example, in the case of a hard disk recorder, an image is encoded according to the MPEG (Moving Picture Coding Experts Group/Moving Picture Experts Group) system or the like and recorded onto a hard disk. When eliminating noise from the recorded image or adding an effect to the recorded image or performing other works such as editing, the arithmetic processing unit is caused to perform the work. Thus, various editing works can be arbitrarily added irrespective of the processing capability and resources of the hard disk recorder.

For example, in the case of a measuring device, measurement data acquired by the measuring device is sent to the arithmetic processing device and the arithmetic processing device is caused to perform necessary processing. Thus, processing of various contents can be arbitrarily added irrespective of the processing capability and resources of the measuring device.

For example, in the case of a copy machine, special processing of a copied image, an advanced OCR (optical character recognition/optical character reader) function or the like can be easily added by using an input/output unit such as touch panel.

For example, in the case of air-conditioning equipment such as air conditioner, a preset temperature and an operating time of a day are set in the arithmetic processing device, and the air-conditioning equipment is controlled by a trigger such as turning on/off of operation from the arithmetic processing device or changing the preset temperature. Thus, finer control can be performed.

Such expansion of the timer function can be applied to general home electronic devices such as washing machine, television, electric rice cooker and refrigerator. As information set in each of the home electronic devices (for example, user settings such as setting of a washing process of the washing machine or a cooking process of the rice cooker, and setting of channel of the television) is externally stored into the arithmetic processing device, it is easy to take over the information (user settings) when purchasing new home electronic devices to replace the existing ones.

This invention has the following advantages. According to the inventions of claims 1, 2, 5, 6, 7, 8, 9 and 10, in the case of using an additional function, by accessing an arithmetic processing device in which a program to execute an additional function is installed, via a network, then making a request for processing of the additional function, and receiving the result of processing, a device which is an incorporated device can add the function irrespective of the resources of the device.

According to the inventions of claims 3 and 4, in the case of using an additional function, by accessing a web server unit of the arithmetic processing device in which a program to execute the additional function is installed, via the network, then making a request for processing of the additional function and receiving the result of processing, the device, which is an incorporated device, can add the function irrespective of the resources of the device. Moreover, since a control unit causes a web page sent from the web server unit to be displayed on a display screen by using a web browser, the control unit need not perform reconstruction of a user interface or the like such as additional display of a button to execute the additional function on the display screen or change of the hierarchical structure of menu corresponding to the additional function.

According to the inventions of claims 8, 9 and 10, reconstruction of the user interface is performed when a designated operation is performed by an input/output unit, such as downloading the user interface itself via the network or reading the user interface from a storage medium or causing the input/output unit to display a preset user interface. Thus, the user interface is not reconstructed frequently and the load on the control unit of the device, which is an incorporated device, is reduced.

According to the invention of claim 11, when certain trouble disables use of an additional function of the arithmetic processing unit during processing, the corresponding user interface is deleted or operation (press, selection or the like) of the user interface is disabled. Thus, a request for processing of the additional function that is disabled during processing can be prevented. Moreover, in the latter case, since the user interface is not reconstructed frequently, the load on the control unit of the device, which is an incorporated device, is reduced.

What is claimed is:

1. A function adding system for adding a new function to an incorporated device, the system comprising:
    an arithmetic processing device in which a program to realize an additional function is installed; and
    a device which is an incorporated device for, when using an additional function, accessing the arithmetic processing device via a network, then making a request for processing of the additional function, and receiving a result of processing,
    wherein the device comprises:
    a communication unit for performing communication via the network;
    a storage unit in which a program to be executed is stored;

an input/output unit for performing display and input; and a control unit for, when using an additional function on the basis of an input from the input/output unit, controlling the communication unit to access the arithmetic processing device via the network, then make a request for processing of the additional function and receive a result of processing, and for causing the input/output unit to display the result of processing, and wherein when the control unit controls the communication unit to access the arithmetic processing device, which is registered in advance or processed otherwise, via the network, and judges that an additional function is available, the control unit reconstructs a user interface and causes the input/output unit to display the user interface, and when use of the additional function is selected on the basis of an input from the input/output unit, the control unit controls the communication unit to request the arithmetic processing device to process the additional function via the network, and the control unit causes the input/output unit to display a result of processing received from the arithmetic processing device by controlling the communication unit.

2. The function adding system as claimed in claim 1, wherein the arithmetic processing device comprises:

a storage unit in which the program to realize the additional function is stored;

a communication unit for performing communication via the network; and a control unit for reading out and executing the program to realize the additional function stored in the storage unit and controlling the communication unit to send a result of processing, which is a result of execution of the program, to the device via the network, when a request for processing of the additional function is received from the device via the network by controlling the communication unit.

3. The function adding system as claimed in claim 1, wherein the arithmetic processing device comprises:

a storage unit in which the program to realize the additional function is stored;

a web server unit for performing communication via the network; and a control unit for reading out and executing the program to realize the additional function stored in the storage unit and controlling the web server unit to send a result of processing, which is a result of execution of the program, to the device via the network, when a request for processing of the additional function is received from the device via the network by controlling the web server unit.

4. The function adding system as claimed in claim 3, wherein when the web server unit is accessed by the device via the network, the web server unit sends a web page to execute an additional function corresponding to the device, to the device via the network.

5. The function adding system as claimed in claim 1, wherein the control unit dynamically reconstructs the user interface in accordance with an additional function that can be realized by the arithmetic processing device.

6. The function adding system as claimed in claim 1, wherein the control unit downloads the user interface itself via the network or reads the user interface from a storage medium.

7. The function adding system as claimed in claim 1, wherein the control unit causes the input/output unit to display a preset user interface.

8. The function adding system as claimed in claim 1, wherein the control unit reconstructs the user interface when a designated operation is performed by the input/output unit.

9. The function adding system as claimed in claim 1, wherein when use of an additional function of the arithmetic processing device is disabled during processing, the control unit deletes the corresponding user interface or disables operation of the user interface.

* * * * *